Patented Oct. 28, 1952

2,615,925

UNITED STATES PATENT OFFICE 2,615,925

PREPARATION OF OLEFINIC COMPOUNDS

Charles A. Bordner, Niagara Falls, N. Y., assignor to E. I. du Pont de Nemours & Company, Wilmington, Del., a corporation of Delaware No Drawing. Application April 5, 1948, Serial No. 19,172

14 Claims. (Cl. 260—653)

This invention relates to the preparation of olefinic compounds and particularly to the preparation of acyclic and cyclic olefinic compounds containing at least two fluorine atoms.

This is a continuation-in-part of my copending application Serial No. 677,517, filed June 18, 1946, for "Preparation of Olefinic Compounds," now Patent No. 2,504,919, patented April 18, 1950.

Haloolefines, such as the cis and trans dichlorethylenes, have been prepared previously by the vapor phase reaction of hydrogen with polyhalohydrocarbons, such as sym. tetrachlorethane, using nickel as a catalyst, but the conversions have been poor. The cis and trans dichlorethylenes have been prepared by other methods, e. g., by heating sym. tetrachlorethane with steam in the presence of iron filings. Such a method also results in relatively poor yields and is not very satisfactory for commercial use, both from cost and operating standpoints. Fluorine-containing olefines have also been prepared by pyrolysis of fluorochloro alkanes, containing hydrogen and chlorine on adjacent carbon atoms, at temperatures of from 400° C. to 1000° C. as disclosed in the application of Downing, Benning, and McHarness, Serial No. 632,116, filed November 30, 1945, now Patent 2,551,573. Such pyrolysis results in dehydrochlorination of relatively expensive starting materials.

It is an object of my invention to provide an improved method for preparing acyclic and cyclic olefinic compounds containing at least two fluorine atoms and from 2 to 6 carbon atoms. Another object is to provide an improved catalytic hydrogenation method for preparing such compounds from saturated fluorochloro compounds. A specific object is to provide an improved method of preparing monochlorotrifluoroethylene and hexafluorocyclobutene from 1,1,2-trifluoro-1,2,2-trichloroethane and 1,2-dichlorohexafluorocyclobutane, respectively, by vapor phase reactions with hydrogen in the presence of improved catalysts. Still further objects will be apparent from the following description.

The above and other objects which may be accomplished in accordance with my invention by the vapor phase reaction of hydrogen with a saturated fluorochloro compound which comprises passing through a metallic copper catalyst heated to a temperature of from about 360° C. to about 700° C. a mixture of hydrogen and vapors of a saturated fluorochloro compound consisting of 2 to 6 carbon atoms, 2 to 12 fluorine atoms, 2 to 12 chlorine atoms and 0 to 4 hydrogen atoms, having at least one chlorine atom on each of two adjacent carbon atoms and at least two fluorine atoms on one carbon atom, each carbon atom, which carries a single fluorine atom but no chlorine atom, being bonded to a carbon atom carrying at least 2 fluorine atoms. Under such conditions, 2 chlorine atoms are split off from adjacent carbon atoms to produce olefinic compounds and other valuable products.

The metallic copper catalyst may be in the form of fragmentary solid metallic copper or it may be supported on a hydrogenation catalyst support, such as activated carbon, silica gel, pumice, alumina gel, porcelain, firebrick, calcium fluoride and polymerized tetrafluoroethylene. When supported copper is used, it may be present in a concentration as low as 5% by weight based on the support, but concentrations of around 10% will give the best results and are preferred. Except where otherwise specifically indicated, the copper catalyst was prepared as follows:

*Copper impregnated carbon.*—470 grams of activated carbon was intimately mixed with 125 grams $CuCl_2$ dihydrate and 175 grams of distilled water and spread in a tray to dry at 70° C. overnight. This preparation was heated at 425–475° C. with $H_2$ passing through until such time as HCl could no longer be detected in the off gas (50–70 hours).

*Copper impregnated silica.*—660 grams of 3–5 mesh silica gel was intimately mixed with 175 grams $CuCl_2$ dihydrate and 160 grams of distilled water. During the mixing, the silica gel particles split so the final mix was 10–15 mesh. This mixture was treated as with carbon supported catalyst above except the time of HCl removal is somewhat shorter (35–50 hours.)

*Metallic copper.*—Light turnings as purchased on the market were used. A mat was made of these turnings, which are 0.001 to 0.003 inch thick and 0.01 to 0.04 inch wide, for use as the catalyst.

The preferred catalyst is fragmentary solid metallic copper. The supported catalyst is generally the more active and produces optimum results at lower temperatures and will generally be used at temperatures if from about 360° C. to about 550° C. and preferably at from about 370° C. to about 480° C. However, the mounts appear to also catalyze C—C bond breakage and side reactions so that the supported catalyst generally produces more cracking which results in lower yields of olefine and higher yields of by-products. As between silica gel and carbon as supports, the silica gel will generally produce lower conversions, but with lower C—F fission and higher C—Cl fission, and hence will produce higher per cent yields of more highly fluorinated olefines. The fragmentary solid metallic copper catalyst is generally less active, particularly for C—C bond breakage, and hence will generally require higher temperatures in order to obtain comparable conversions, but will usually produce higher conversions and higher per cent yields of olefine. For optimum results, it will generally be necessary to employ the fragmentary solid metallic copper at temperatures of from about 460° C. to about 700° C. and preferably from about 475° C. to about 600° C.

The fluorochloro compounds, which are to be employed as starting materials in my process, may be either acyclic or cyclic, and are saturated fluorochloro compounds consisting of 2 to 6 carbon atoms, 2 to 12 fluorine atoms, 2 to 12 chlorine atoms and 0 to 4 hydrogen atoms with at least one chlorine atom on each of two adjacent carbon atoms and at least two fluorine atoms on at least one carbon atom. Where the compound contains a carbon atom which carries a single fluorine atom but no chlorine atom (in other words, a carbon atom carrying one fluorine atom and one or two hydrogen atoms only), it must be bonded to a carbon atom carrying at least two fluorine atoms. The preferred fluorochloro compounds are those which consist of 2 to 6 carbon atoms, 2 to 12 fluorine atoms and 2 to 12 chlorine atoms with at least one chlorine atom on each of two adjacent carbon atoms and at least two fluorine atoms on one carbon atom. The preferred acyclic fluorochloro compounds are those which contain at least 3 chlorine atoms and particularly 1,1,2 - trifluoro - 1,2,2 - trichlorethane which yields the particularly valuable 1,1,2-trifluoro-2-chloroethylene. The preferred cyclic saturated fluorochloro compounds will contain 4 to 5 carbon atoms and only 2 chlorine atoms, and particularly 1,2-dichloro-hexafluoro-cyclobutane which yields the particularly valuable hexafluorocyclobutene.

The type of reaction which takes place to yield the olefinic compounds in accordance with my invention is believed to involve the reaction of 2 atoms of hydrogen with 2 chlorine atoms positioned on adjacent carbon atoms of the saturated fluorochloro compound whereby there are formed 2 moles of hydrogen chloride and an olefinic compound in which the 2 carbon atoms, from which chlorine has been removed, are finally joined by a double bond as illustrated by the following equations:

$$CCl_2F-CClF_2 + H_2 \longrightarrow CClF=CF_2 + 2HCl$$

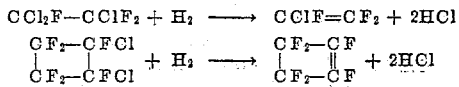

It will be apparent that not all of the saturated fluorochloro compounds are equally reactive and that some will be substantially more resistant than others. A particularly resistant compound is $CClF_2-CClF_2$. Such more resistant compounds will generally require the higher temperatures and may even require the more active catalysts in order to obtain the optimum results. As a general rule, there is an increased tendency for the thermal cracking of the starting material with increase in the temperatures employed. Thus, the higher temperatures will generally result in higher conversions of the starting material to other products, but with lower per cent yields of olefine and higher per cent yields of by-products in the reaction products. Usually, this will not be particularly objectionable as the by-products are usually valuable materials. However, when it is desired to obtain mainly the olefinic material, it will be advisable to operate in the lower range of temperature and recycle the unconverted starting material.

Satisfactory results are obtained by employing equimolar quantities of hydrogen and saturated fluorochloro compound. However, either of the reactants may be employed in excess with good results, but it will usually be desirable to use a slight excess of hydrogen. In general, the process will be carried out at atmospheric pressure, but pressures above or below atmospheric pressure may be used if desired.

The products obtained are useful as solvents and for other purposes. The acyclic olefinic compounds are particularly valuable for forming polymers and interpolymers with polymerizable olefinic compounds, particularly $CF_2=CF_2$. The cyclic olefinic compounds are oxidizable to the valuable dibasic acids, particularly the perfluoro dibasic acids.

The reaction may be carried out in tubes of any substantially inert material, such as glass, nickel or "Inconel," which is an alloy of the approximate composition: nickel 79.5%, chromium 13%, copper 0.2%, iron 6.5%, silicon 0.25%, manganese 0.25% and carbon 0.08%.

In order to more clearly illustrate my invention and preferred modes of carrying the same into effect, the following examples are given:

EXAMPLE I

A reactor, consisting of a 1½ in. nickel pipe 28 in. long, was secured in a vertical position and provided at the top with an inlet and a thermocouple well extending the length of the reactor. The bottom of the reactor was provided with an outlet passing to a cold-water scrubber which served to dissolve out the hydrogen halides from the product gases. This scrubber was cooled in ice-water and was connected to a low temperature cooler for condensing materials not collectable at ice-water temperatures. The reactor tube was packed with 10 mesh activated carbon previously impregnated with copper catalyst. Means were provided for delivering the fluorochloro compound and hydrogen.

The catalyst material was made up by impregnating activated carbon with copper chloride to give a catalyst body containing 10% by weight of copper, after the copper chloride had been reduced to the metallic state. After treating the activated carbon with the copper chloride solution, it was first dried to constant weight at 110° C., and then further dried at 400° C. in a current of dry nitrogen. Reduction was then accomplished by means of a stream of hydrogen at 400° C. until no more hydrogen chloride was evolved. The activated carbon occupied a volume of one liter.

While maintaining a reaction temperature of 370–390° C. in the reaction zone, hydrogen and 1,1-difluoro-1,2,2,2-tetrachloroethane were were fed into the system at rates of 0.65 liter (S. T. P.) and 4.28 grams per minute, respectively. During 3 hours, a total of 3.78 moles of difluorotetrachloroethane and 5.2 moles of hydrogen were fed. 6.50 moles of hydrogen chloride were recovered from the product gases, together with a mixture of fluorochlorocarbons which, upon fractionation, yielded the following:

| Product | Moles | Mole Percent Conversion | Percent Yield |
|---|---|---|---|
| 1,1-difluoro-2,2-dichloroethylene | 2.71 | 72 | 90 |
| 1,1-difluoro-1,2,2,2-tetrachloroethane | .76 | 20 | |
| Total | 3.47 | 92 | 90 |

EXAMPLE 2

The apparatus was that described in Example 1 except that a glass tube 50 mm. in diameter and 28″ long was used as the reactor.

The catalyst material was made by impregnating silica gel with copper chloride to give a catalyst body containing 10% by weight of copper, after the copper chloride had been reduced to the metallic state. The preparation of catalyst and reduction were carried out in the manner previously described for the preparation of the copper catalyst on activated carbon. The volume of catalyst was one liter.

(a) While maintaining a reaction temperature of 360–370° C. in the reaction zone, hydrogen and 1,1,2-trifluoro-1,2,2-trichloroethane were fed into the system at a rate of 0.672 liter (S. T. P.) and 4.23 grams per minute, respectively. During 1½ hours, a total of 3.68 moles of trifluorotrichloroethane and 2.70 moles of hydrogen were fed. 1.16 moles of hydrogen chloride were recovered from the product gases, together with a mixture of fluorochlorocarbons which, upon fractionation, yielded the following:

| Product | Moles | Mole Percent Conversion | Percent Yield |
|---|---|---|---|
| 1,1,2-trifluoro-2-chloroethylene | 0.51 | 13.9 | 77 |
| 1,1,2-trifluoro-1,2,2-trichloroethane | 3.02 | 70.0 | |
| Total | 3.53 | 83.9 | 77 |

(b) While maintaining a reaction temperature of 460–480° C. in the reaction zone, hydrogen and 1,1,2-trifluoro-1,2,2-trichloroethane were fed into the system at a rate of 0.715 liter (S. T. P.) and 4.9 grams per minute, respectively. During 2½ hours, a total of 4.33 moles of trifluorotrichloroethane and 4.75 moles of hydrogen were fed. 5.3 moles of hydrogen halides[1] were recovered from the product gases, together with a mixture of fluorochlorocarbons which, upon fractionation, yielded the following:

| Product | Moles | Mole Percent Conversion | Percent Yield |
|---|---|---|---|
| 1,1,2-trifluoro-2-chloroethylene | 2.13 | 49 | 74 |
| 1,1,2-trifluoro-1,2,2-trichloroethane | 1.46 | 34 | |
| Total | 3.59 | 83 | 74 |

In the following Examples 3 to 6 and in experiments illustrated in Table I, which do not correspond with any of the examples, 3 different size tubes were employed depending upon the quantity of starting material and the desire for precision. The tubes were 38 cms. long by 1.3 cm. internal diameter, 56 cms. long by 2.6 cms. internal diameter, and 114 cms. long by 4.2 cms. internal diameter. The tubes were heated with a 1 or 2½ foot electrical resistance heated tube furnace. The reactants were metered in and the reaction products were passed through scrubbers and cold traps. The identity and quantity of acid gases absorbed in the caustic scrubber were determined and the organic materials collected in the cold traps were identified by boiling points, molecular weights, and infrared absorption curves. In cases of doubt, tests for unsaturation were also conducted on the product.

EXAMPLE 3

0.284 mole of $CCl_2FCClF_2$ and 0.37 mole of $H_2$ were fed through metallic copper in a nickel tube at 590° C. in one hour at a contact time of 9 seconds. The number of moles of the product formed divided by the number of moles of the reactant fed represents conversion, and the number of moles of the product formed divided by the number of moles of the reactant used up (not recovered) represents the yield. On this basis, the following was found:

| Products | Moles | Percent Conversion | Percent Yield |
|---|---|---|---|
| Acid Materials: | | | |
| HCl | 0.42 | 74 | |
| HF | .07 | 12 | |
| Starting Material Recovered: | | | |
| $CCl_2FCClF_2$ | .139 | 49 | |
| Organic Products: | | | |
| $CClF=CF_2$ | .110 | 39 | 76 |
| $CF_2\text{-}CFCl$ $\|$ $CF_2\text{-}CFCl$ | + | | |

EXAMPLE 4

0.284 mole of $CClF_2CClF_2$ and 0.37 mole of $H_2$ were fed through metallic copper in a nickel tube at 700° C. in one hour at a contact time of 9 seconds. As in Example 3, the following was found:

| Products | Moles | Percent Conversion | Percent Yield |
|---|---|---|---|
| Acid Materials: | | | |
| HCl | 0.25 | 44 | |
| HF | .04 | 7 | |
| Starting Material Recovered: | | | |
| $CClF_2CClF_2$ | .072 | 25 | |
| Organic Products: | | | |
| $CF_2=CF_2$ | .009 | 3 | 4 |
| $CH_2F_2$ | .031 | 15 | 17 |
| $CHClF_2$ | .018 | 13 | 14 |
| $CCl_2F_2$ | .018 | 13 | 14 |
| $CHF_2CHF_2$ | .036 | 13 | 17 |
| $CHF_2CClF_2$ | .040 | 14 | 19 |

[1] These figures are based on one-half the number of moles since each molecule of starting product must split to give two molecules of this reaction product.

EXAMPLE 5

0.306 mole $CClF_2CClF_2$ and 0.394 mole $H_2$ were fed through metallic copper in a nickel tube at 600° C. over 64 minutes at a contact time of 9 seconds. As in Examples 3 and 4, the following was found:

| Products | Moles | Percent Conversion | Percent Yield |
|---|---|---|---|
| HCl | 0.054 | 8.8 | |
| HF | .003 | .5 | |
| Starting Material Recovered: | | | |
| $CClF_2CClF_2$ | .213 | 70 | |
| Organic Products: | | | |
| $CF_2=CF_2$ | .003 | 1 | 3 |
| $CH_2F_2$ | .003 | .5 | 1.5 |
| $CHClF_2$ | .004 | .6 | 2.1 |
| $CHF_2CHF_2$ | .006 | 2 | 6.5 |
| $CHF_2CClF_2$ | .003 | 1 | 3 |

EXAMPLE 6

0.385 mole of

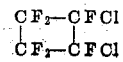

---

[1] Significant amounts of hydrogen fluoride were found in the acids in the cold water scrubber. Examination of the catalyst showed partial disintegration, and etching prevalent on the walls of the reactor.

and 0.505 mole of $H_2$ were fed through copper impregnated silica gel catalyst in a nickel tube at 550° C. in one hour at a contact time of 10 seconds. As in the previous Examples 3–5, the following has been found:

| Products | Moles | Percent Conversion | Percent Yield |
|---|---|---|---|
| Acid Materials: | | | |
| HCl | 0.133 | 17 | |
| HF | .049 | 6 | |
| Starting Material Recovered: | | | |
| $CF_2$-CFCl<br>$\|$ $\|$<br>$CF_2$-CFCl | .336 | 87 | |
| Organic Product: | | | |
| $CF_2$-CF<br>$\|$ $\|\|$<br>$CF_2$-CF | .037 | 10 | 76 |

It has been found that, at higher temperatures, the conversion to $$\begin{array}{c} CF_2-CF \\ |\quad\ \ \| \\ CF_2-CF \end{array}$$

is increased. However, there is considerable loss in yield due to the depolymerization of $$\begin{array}{c} CF_2-CFCl \\ |\qquad\quad | \\ CF_2-CFCl \end{array} \text{ to } CClF=CF_2$$

In Examples 4 and 5, it will be noted that substantial amounts of $CHF_2$—$CHF_2$ and $CHF_2$—$CClF_2$ are formed. These are valuable intermediates which can be readily converted to olefines. For example, $CHF_2$—$CClF_2$ can be dehydrochlorinated by pyrolysis as disclosed by Downing, Benning, and McHarness in Serial No. 632,116. The $CHF_2$—$CHF_2$ can be readily chlorinated to $CHF_2$—$CHF_2$ which can then be dehydrochlorinated by pyrolysis.

The results of the preceding examples and other experiments are summarized in Table I as follows, wherein the catalyst supports are indicated by the symbols, C for activated carbon and $SiO_2$ for silica gel:

*Table I*

| Starting Material | Catalyst | Temperature, °C. | Conversion, Percent Olefine | Yield, Percent Olefine |
|---|---|---|---|---|
| $CCl_2F$-$CClF_2$ | Cu | 590 | 39 | 76 |
| $CCl_2F$-$CClF_2$ | Cu on C | 450 | 8 | 26 |
| $CCl_2F$-$CClF_2$ | Cu on $SiO_2$ | 360–370 | 13.9 | 77 |
| $CCl_2F$-$CClF_2$ | Cu on $SiO_2$ | 460–480 | 49 | 74 |
| $CClF_2$-$CClF_2$ | Cu | 700 | 3 | 4 |
| $CClF_2$-$CClF_2$ | Cu | 600 | 1 | 3 |
| $CClF_2$-$CClF_2$ | Cu on C | 450 | 5 | 55 |
| $CClF_2$-$CClF_2$ | Cu on $SiO_2$ | 500 | 1 | 97 |
| $CF_3$-$CCl_2$-$CCl_2$-$CF_3$ | Cu | 480 | 45 | 100 |
| $CF_2Cl$-$CCl_3$ | Cu on C | 370–390 | 72 | 90 |
| $CF_2$-CFCl<br>$\|$ $\|$<br>$CF_2$-CFCl | Cu on $SiO_2$ | 550 | 10 | 76 |
| $F_2C\begin{array}{c}\diagup CF_2-CCl_2 \\ \diagdown CF_2-CCl_2\end{array}$ | Cu | 460 | 100 | 100 |

It will be understood that the examples and experiments heretofore given are given for illustrative purposes solely and that many variations and modifications can be made therein without departing from the spirit or scope of my invention and my invention is not to be limited to the specific embodiments disclosed in such examples and experiments. The temperatures, pressures, apparatus, proportions of ingredients, contact times and other conditions may be varied as described without departing from my invention. Also, other saturated fluorochloro compounds may be employed in place of those specifically disclosed, such as:

$CHCl_2$—$CClF_2$
$CF_3$—$CClF$—$CCl_2F$
$CCl_3$—$CCl_2$—$CCl_2$—$CClF_2$
$CF_3$—$CHCl$—$CCl_2$—$CF_3$ $$\begin{array}{c} CF_2-CCl_2 \\ |\qquad\quad | \\ CF_2-CCl_2 \end{array}$$

$$\begin{array}{c} CF_2-CF_2-CFCl \\ |\qquad\qquad\qquad | \\ CF_2-CF_2-CFCl \end{array}$$

It will be apparent that I have provided a new and improved process of preparing olefinic compounds, containing fluorine, and other valuable products, which is simple and economical to operate. It has an advantage over the pyrolysis process of Downing, Benning, and McHarness in Serial No. 632,116, in that it employs different starting materials which are cheaper and more readily available and which involve a different reaction. It is also much cheaper than the known zinc process for dechlorinating similar compounds. It will thus be apparent that my invention provides an improved process which is generally more economical to operate than the processes of the prior art.

I claim:

1. A process for producing an olefinic compound containing fluorine which comprises passing a mixture of hydrogen and vapors of a saturated fluorochloro compound, consisting of 2 to 6 carbon atoms, 2 to 12 fluorine atoms and 2 to 12 chlorine atoms, having at least one chlorine atom on each of two adjacent carbon atoms and at least two fluorine atoms on one carbon atom, through a catalyst consisting of fragmentary solid metallic copper heated to a temperature of from about 460° C. to about 700° C.

2. A process for producing an olefinic compound containing fluorine which comprises passing a mixture of hydrogen and vapors of a saturated fluorochloro compound, consisting of 2 carbon atoms, 2 to 3 fluorine atoms, and 3 to 4 chlorine atoms, having at least one chlorine atom on each carbon atom and at least two fluorine atoms on one carbon atom, through a catalyst consisting of fragmentary solid metallic copper heated to a temperature of from about 460° C. to about 590° C.

3. A process for producing an olefinic compound containing fluorine which comprises passing a mixture of hydrogen and vapors of $CCl_2F$—$CClF_2$ through a catalyst consisting of fragmentary solid metallic copper heated to a temperature of from about 460° C. to about 590° C.

4. A process for producing an olefinic compound containing fluorine which comprises passing a mixture of hydrogen and vapors of a saturated cyclic fluorochloro compound, consisting of 4 to 5 carbon atoms, 4 to 8 fluorine atoms, and 2 to 6 chlorine atoms, having at least one chlorine atom on each of two adjacent carbon atoms and two fluorine atoms on each of at least two carbon atoms, through a catalyst consisting of fragmentary solid metallic copper heated to a temperature of from about 460° C. to about 600° C.

5. A process for producing an olefinic compound containing fluorine which comprises passing a mixture of hydrogen and vapors of

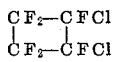

through a catalyst consisting of fragmentary solid metallic copper heated to a temperature of from about 460° C. to about 600° C.

6. A process for producing an olefinic compound containing fluorine which comprises passing a mixture of hydrogen and vapors of a saturated fluorochloro compound, consisting of 2 to 6 carbon atoms, 2 to 12 fluorine atoms and 2 to 12 chlorine atoms, having at least one chlorine atom on each of two adjacent carbon atoms and at least two fluorine atoms on one carbon atom, through a catalyst consisting of a hydrogenation catalyst support impregnated with metallic copper heated to a temperature of from about 360° C. to about 550° C.

7. A process for producing an olefinic compound containing fluorine which comprises passing a mixture of hydrogen and vapors of a saturated fluorochloro compound, consisting of 2 carbon atoms, 2 to 3 fluorine atoms, and 3 to 4 chlorine atoms, having at least one chlorine atom on each carbon atom and at least two fluorine atoms on one carbon atom, through a catalyst consisting of a hydrogenation catalyst support impregnated with metallic copper heated to a temperature of from about 360° C. to about 480° C.

8. A process for producing an olefinic compound containing fluorine which comprises passing a mixture of hydrogen and vapors of $$CCl_2F\text{---}CClF_2$$

through a catalyst consisting of a hydrogenation catalyst support impregnated with metallic copper heated to a temperature of from about 360° C. to about 480° C.

9. A process for producing an olefinic compound containing fluorine which comprises passing a mixture of hydrogen and vapors of a saturated cyclic fluorochloro compound, consisting of 4 to 5 carbon atoms, 4 to 8 fluorine atoms, and 2 to 6 chlorine atoms, having at least one chlorine atom on each of two adjacent carbon atoms and two fluorine atoms on each of at least two carbon atoms, through a catalyst consisting of a hydrogenation catalyst support impregnated with metallic copper heated to a temperature of from about 360° C. to about 550° C.

10. A process for producing an olefinic compound containing fluorine which comprises passing a mixture of hydrogen and vapors of

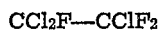

through a catalyst consisting of a hydrogenation catalyst support impregnated with metallic copper heated to a temperature of about 550° C.

11. A process for producing an olefinic compound containing fluorine which comprises passing a mixture of hydrogen and vapors of $$CF_2Cl\text{---}CCl_3$$

through a metallic copper catalyst heated to a temperature of from about 360° C. to about 590° C.

12. A process for producing an olefinic compound containing fluorine which comprises passing a mixture of hydrogen and vapors of a saturated fluorochloro compound containing 2 to 6 carbon atoms, 2 to 12 fluorine atoms and 2 to 12 chlorine atoms, having at least one chlorine atom on each of two adjacent carbon atoms and at least two fluorine atoms on one carbon atom, each carbon atom which carries a single fluorine atom but no chlorine atom being bonded to a carbon atom carrying at least two fluorine atoms, which fluorochloro compound is a member of the class consisting of fluorochloro compounds which consist of carbon, fluorine and chlorine atoms and fluorochloro compounds which consist of carbon, fluorine, chlorine and 1 to 4 hydrogen atoms, through a metallic copper catalyst heated to a temperature of from about 360° C. to about 700° C.

13. A process for producing an olefinic compound containing fluorine which comprises passing a mixture of hydrogen and vapors of a saturated fluorochloro compound containing 2 to 6 carbon atoms, 2 to 12 fluorine atoms and 2 to 12 chlorine atoms, having at least one chlorine atom on each of two adjacent carbon atoms and at least two fluorine atoms on one carbon atom, each carbon atom which carries a single fluorine atom but no chlorine atom being bonded to a carbon atom carrying at least two fluorine atoms, which fluorochloro compound is a member of the class consisting of fluorochloro compounds which consist of carbon, fluorine and chlorine atoms and fluorochloro compounds which consist of carbon, fluorine, chlorine and 1 to 4 hydrogen atoms, through a catalyst consisting of fragmentary solid metallic copper heated to a temperature of from about 460° C. to about 700° C.

14. A process for producing an olefinic compound containing fluorine which comprises passing a mixture of hydrogen and vapors of a saturated fluorochloro compound containing 2 to 6 carbon atoms, 2 to 12 fluorine atoms and 2 to 12 chlorine atoms, having at least one chlorine atom on each of two adjacent carbon atoms and at least two fluorine atoms on one carbon atom, each carbon atom which carries a single fluorine atom but no chlorine atom being bonded to a carbon atom carrying at least two fluorine atoms, which fluorochloro compound is a member of the class consisting of fluorochloro compounds which consist of carbon, fluorine and chlorine atoms and fluorochloro compounds which consist of carbon, fluorine, chlorine and 1 to 4 hydrogen atoms, through a catalyst consisting of a hydrogenation catalyst support impregnated with metallic copper heated to a temperature of from about 360° C. to about 550° C.

CHARLES A. BORDNER.

REFERENCES CITED

The following references are of record in the file of this patent:

UNITED STATES PATENTS

| Number | Name | Date |
|---|---|---|
| 2,401,897 | Benning et al. | June 11, 1946 |
| 2,478,933 | Bratton et al. | Aug. 16, 1949 |
| 2,504,919 | Bordner | Apr. 18, 1950 |

OTHER REFERENCES

Vavon et al., Comptes Rendus 206, 1387-9.